United States Patent
Xiao et al.

(10) Patent No.: US 7,460,733 B2
(45) Date of Patent: Dec. 2, 2008

(54) SYSTEM AND METHOD FOR REGISTRATION AND MODELING OF DEFORMABLE SHAPES BY DIRECT FACTORIZATION

(75) Inventors: Jing Xiao, Pittsburgh, PA (US); Bogdan Georgescu, Princeton, NJ (US); Xiang Zhou, Exton, NJ (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 561 days.

(21) Appl. No.: 11/215,419

(22) Filed: Aug. 30, 2005

(65) Prior Publication Data

US 2006/0045347 A1  Mar. 2, 2006

Related U.S. Application Data

(60) Provisional application No. 60/606,632, filed on Sep. 2, 2004.

(51) Int. Cl.
*G06K 9/32* (2006.01)
(52) U.S. Cl. ............. 382/294; 345/419; 382/103; 382/154; 382/203
(58) Field of Classification Search ............. 382/190, 382/203, 217, 282, 294, 103, 107, 154; 345/419, 345/420
See application file for complete search history.

(56) References Cited

U.S. PATENT DOCUMENTS

| | | | | |
|---|---|---|---|---|
| 5,926,568 | A * | 7/1999 | Chaney et al. | 382/217 |
| 6,137,491 | A * | 10/2000 | Szeliski | 345/419 |
| 6,408,107 | B1 * | 6/2002 | Miller et al. | 382/294 |
| 6,611,615 | B1 * | 8/2003 | Christensen | 382/130 |
| 6,614,429 | B1 * | 9/2003 | Zhang et al. | 345/420 |
| 6,628,819 | B1 * | 9/2003 | Huang et al. | 382/154 |
| 6,873,724 | B2 * | 3/2005 | Brand | 382/154 |

(Continued)

OTHER PUBLICATIONS

Yali Amit, Graphical Shape Templates for Automatic Detection with Applications to MRI Brain Scans, 1997, University of Chicago, p. 1-9.*

(Continued)

*Primary Examiner*—Gregory M Desire

(57) ABSTRACT

A method of registering and modeling a deformable shape in a digitized image is provided, comprising the steps of providing a measurement matrix W of N measurements of P points of a D-dimensional deformable shape, determining a basis number K for the N measurements, wherein K<N, and selecting K measurements of said measurement matrix W as a basis set, decomposing said measurement matrix W into a matrix product M×∃B, wherein M is a proposed scaled rotation matrix and B is a proposed basis matrix, computing a matrix $Q_k$ defined by $$M_i Q_k M_j^T = \begin{cases} I_{D \times D}, & i = j = k \\ 0_{D \times D}, & (i, j) \in \Phi \end{cases},$$

where Φ stands for {(i,j)|i=1, ..., K; j=1, ..., N, iγk}, which represents an ambiguity matrix transforming the proposed scaled rotation matrix and the proposed basis matrix into a true scaled rotation matrix and a true basis matrix; decomposing the matrix $Q_k$ into $g_k g_k^T$, for k=1, ..., K, wherein $g_k$ is a column of a D∃K%D∃K matrix G; and recovering the true scaled rotation matrix from M×∃G and the true basis matrix from $G^{-1}$×∃B.

21 Claims, 2 Drawing Sheets

U.S. PATENT DOCUMENTS

| | | | | |
|---|---|---|---|---|
| 7,292,737 | B2 * | 11/2007 | Zhou et al. | 382/294 |
| 7,421,101 | B2 * | 9/2008 | Georgescu et al. | 382/128 |
| 2002/0113799 | A1 * | 8/2002 | Brand | 345/582 |
| 2003/0076990 | A1 | 4/2003 | Brand | |
| 2006/0045347 | A1 * | 3/2006 | Xiao et al. | 382/190 |
| 2007/0014457 | A1 * | 1/2007 | Jolly et al. | 382/128 |

OTHER PUBLICATIONS

Jing Xiao et al, Simultaneous Registration and Modeling of Deformable Shapes, 2006, IEEE Computer Society Conference on Computer Vision and Pattern Recognition, p. 1-8.*

Georgescu et al., "Towards Registration and Modeling of Deformable Shapes", pp. 1-8, ICCV 2005 Submission, Paper ID: 346.

Xiao, Jing et al., "A Closed-Form Solution to Non-Rigid Shape and Motion Recovery," *Computer Vision*, May 11, 2004 ; pp. 573-587; vol. 4; XP019005950 ISBN: 3-540-21981-1.

Xiao, Jing et al.: "Non-Rigid shape and Motion Recovery: Degenerate Deformations," *Computer Vision and Pattern Recognition*; Jun. 27, 2004; pp. 668-675; vol. 1; XP010708624; ISBN 0-7695-2158-4.

Akca, Devrim M.; "Generalized Procrustes Analysis and Its Applications In Photogrammetry"*Institute of Geodesy and Photogrammetry*, Jun. 2003; www.photogrammetry.ethz.ch/general/persons/devrim/Praktikum_Procrustes.pdf>.

International Search Report, Jan. 2006.

* cited by examiner

SYSTEM AND METHOD FOR REGISTRATION AND MODELING OF DEFORMABLE SHAPES BY DIRECT FACTORIZATION

CROSS REFERENCE TO RELATED UNITED STATES APPLICATIONS

This application claims priority from "Registration and Modeling of Deformable Shapes: A Factorization Approach", U.S. Provisional Application No. 60/606,632 of Xiao, et al., filed Sep. 2, 2004, the contents of which are incorporated herein by reference.

TECHNICAL FIELD

This invention is directed to the registration of deformable shapes in digitized images.

DISCUSSION OF THE RELATED ART

Statistical shape models of deformable objects are important for many tasks, such as segmenting the 2-D MRI brain images, tracking the myocardial wall motion from the 3-D ultrasound images, and tracking and recognizing human faces from 2-D1 videos. However, many measurement methods produce coordinates of the object shapes with respect to a local coordinate system, e.g. 2-D images of human faces or 3-D ultrasound volumes of human hearts taken from different viewpoints. To extract the shape models, these measurements in different local coordinate systems have to be registered into a common system.

When the object is rigid, the variation of the observed shapes comes from the difference between the orientations and scales of the local coordinate systems. Registration of these shapes amounts to the estimation of the similarity transformations between them, which include scaling, rotation, and translation.

In real world, many biological objects and natural scenes vary their shapes, such as human faces and hearts. The variation of the observed shapes arises from two factors that are coupled to each other: rigid similarity transformations and non-rigid shape deformations. The purpose of registration is thus decomposing and recovering these two factors. One well known approach, Generalized Procrustes Analysis (GPA), treats the shape deformations as Gaussian noise and aligns each observed shape with a centroid shape, which is the mean of the already-aligned shapes, as in rigid cases. This registration process is iterated until it converges to a stable centroid.

The shapes of deformable objects are often linear combinations of certain shape bases, such as 2D and 3D human face shapes and 2D myocardium shapes. When such shape deformations are insignificant, i.e. the mean shape is dominant compared with the deformations, or when they are symmetric with respect to the mean shape, i.e. the positive and negative offsets cancel each other, these deformations can be regarded as Gaussian noise and Generalized Procrustes Analysis works successfully on registering the deformable shapes. Then Principle Component Analysis can be applied on the aligned shapes to compute the linear shape deformation model. However, in many applications, the shape deformations are significant and asymmetric, e.g. a dynamic scene consisting of static buildings and moving cars, or two eyes blinking asynchronously. Under such situations, the shape deformations cannot be regarded as Gaussian noise. Because Generalized Procrustes Analysis does not take into account the non-rigid shape deformations during the registration process, such deformations will bias the registration and the consequential linear shape model.

SUMMARY OF THE INVENTION

Exemplary embodiments of the invention as described herein generally include methods and systems for a direct factorization registration that decouples the rigid similarity transformation and non-rigid shape deformations. Direct factorization yields a linear closed-form solution to simultaneously registering deformable shapes at arbitrary dimensions and reconstructing the linear deformation model. The linear basis representation of deformable shapes has been successfully used to recover 3D shapes from 2D images in. A direct factorization method enforces linear constraints respectively on orthonormality of the rigid rotations and uniqueness of the deformable shape bases, and yields a linear closed-form solution to simultaneously registering the observed shapes and reconstructing the deformation bases.

An exemplary embodiment of the present invention provides a method of registering and modeling a deformable shape in a digitized image, comprising the steps of providing a set of measurements of a deformable shape, wherein said set of measurements forms a measurement matrix, and simultaneously solving for a rigid registering transformation and a linear shape model.

Another exemplary embodiment of the present invention provides a method of registering and modeling a deformable shape in a digitized image, comprising the steps of providing a measurement matrix W of N measurements of P points of a D-dimensional deformable shape, determining a basis number K for the N measurements, wherein K<N, and selecting K measurements of said measurement matrix W as a basis set, decomposing said measurement matrix W into a matrix product M×∃B, wherein M is a proposed scaled rotation matrix and B is a proposed basis matrix, computing a matrix $Q_k$ defined by $$M_i Q_k M_j^T = \begin{cases} I_{D \times D}, & i = j = k \\ 0_{D \times D}, & (i, j) \in \Phi \end{cases},$$

where $\Phi$ stands for $\{(i, j) | i=1, \ldots, K; j=1, \ldots, N; i \gamma k\}$, which represents an ambiguity matrix transforming the proposed scaled rotation matrix and the proposed basis matrix into a true scaled rotation matrix and a true basis matrix, decomposing the matrix $Q_k$ into $g_k g_k^T$, for $k=1, \ldots, K$, wherein $g_k$ is a column of a D∃K%D∃K matrix G, and recovering the true scaled rotation matrix from M×∃G and the true basis matrix from $G^{-1} \times \exists B$.

Yet another embodiment of the present invention provides a program storage device readable by a computer, tangibly embodying a program of instructions executable by the computer to perform the method steps for registering and modeling a deformable shape in a digitized image, comprising the steps of providing a set of measurements of a deformable shape, wherein said set of measurements forms a measurement matrix, and simultaneously solving for a rigid registering transformation and a linear shape model.

DETAILED DESCRIPTION OF THE PREFERRED EMBODIMENTS

Figure 1:
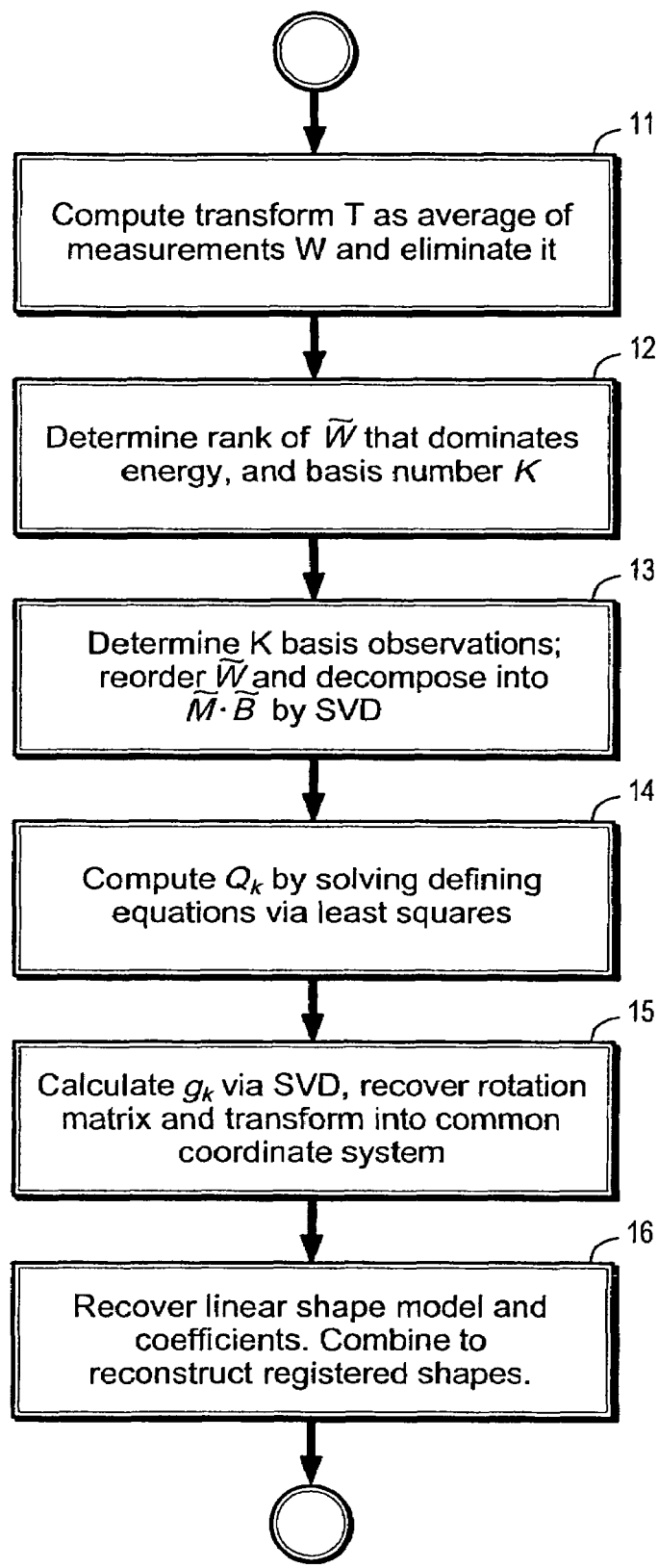
FIG. 1 depicts a flow chart of a direct factorization registration procedure according to an embodiment of the invention.

Exemplary embodiments of the invention as described herein generally include systems and methods for direct factorization registration that decouples the rigid similarity transformation and non-rigid shape deformations.

According to an embodiment of the invention, the shape of a non-rigid object can be regarded as a linear combination of K shape bases $\{B_k, k=1, \ldots, K\}$. Each of the bases is a D×P matrix, which direct P points on a shape to alter locations in a D-dimensional object shape space. Accordingly, the coordinate of the shape at time i is $$S_i = \sum_{k=1}^{K} l_{ik} B_k,$$

where $l_{ik}$ is the combination weight of the basis $B_k$. The object shape can be measured from different views, in different distances, and at different scales. Thus there is a similarity transformation between the object shape and its measurement, as follows, $$W_i = c_i R_i S_i + T_i \mathbf{1} \qquad (2)$$

where $c_i$ is a nonzero scalar, $R_i$ is a D×D orthonormal matrix, and $T_i$ is a D×1 vector, which respectively stand for the scaling, rotation, and translation transformations, and together form the similarity transformation. 1 is a 1×P vector, of which all elements are ones. Replacing $S_i$ using Eq. (1) and absorbing $c_i$ into $l_{ik}$, one obtains $$W_i = (l_{i1} R_i, \ldots, l_{iK} R_i, T_i) \cdot \begin{pmatrix} B_1 \\ \vdots \\ B_K \\ 1 \end{pmatrix}. \qquad (3)$$

If N observations of the deformable shape are measured, the measurements can be stacked into a DN×P matrix W. Each of the N D-rows in W contains an observed shape respectively. Due to Eq. (3), since all the observed shapes refer to the same set of shape bases, one obtains $$W = (M T) \begin{pmatrix} B \\ 1 \end{pmatrix}, \qquad (4)$$

where M is a DN×DK scaled rotation matrix, B is a DK×P basis matrix, and T is a DN×1 translation vector, as shown in the following:

$$M = \begin{pmatrix} l_{11} R_1 \ldots l_{1K} R_1 \\ \vdots \\ l_{N1} R_N \ldots l_{NK} R_N \end{pmatrix} \qquad (5)$$

$$B = \begin{pmatrix} B_1 \\ \vdots \\ B_K \end{pmatrix}$$

$$T = \begin{pmatrix} T_1 \\ \vdots \\ T_N \end{pmatrix}$$

The registration and modeling of deformable shapes thus involves decomposing the measurement matrix W to simultaneously recover the rigid similarity transformations in M and T and reconstructing the non-rigid deformation model in B. To accurately align the observed shapes, the measurements in W should be directly factorized as in Eq. (4) to simultaneously reconstruct the deformable shape bases in B and the rigid similarity transformations in M and T.

According to an embodiment of the invention, a first step in factoring W is positioning the world coordinate origin at the center of the observed shape. Then the translations in T equal the average coordinates of the shape points. Subtracting them from the measurements yields $\tilde{W}=W-T\cdot\mathbf{1}=MB$. Assuming that the shape deformations and rigid rotations are both non-degenerate, i.e. the scaled rotation matrix M and the shape bases matrix B are both of full rank, according to Eq. (5), the rank of M is min{DN,DK} and that of B is min{DK,P}. Their product, $\tilde{W}$, is of rank min{DK, DN, P}. In general, the shape number N and point number P are much larger than the basis number K, such that DN>DK and P>DK. The rank of $\tilde{W}$ is thus DK and K is determined by $K=\mathrm{rank}(\tilde{W})/D$.

According to an embodiment of the invention, a Singular Value Decomposition (SVD) can be used to decompose $\tilde{W}$ into a product of a DN×DK matrix $\tilde{M}$ and a DK×P matrix $\tilde{B}$. This decomposition is only determined up to a non-singular DK×DK linear transformation. The true scaled rotations M and bases B are of the forms $$M=\tilde{M}\cdot G$$

$$B=G^{-1}\cdot\tilde{B}' \qquad (6)$$

where G is the non-singular DK×DK ambiguity transformation that determines M and B. The determination of a deformable shape registration and modeling now becomes computing G given $\tilde{W}$.

The matrix G has K D-columns, denoted as $g_k$, $k=1, \ldots, K$, where each column is a DK×D matrix. These columns are independent of each other since G is non-singular. According to Eqs. (5, 6), $g_k$ satisfies, $$\tilde{M} g_k = \begin{pmatrix} l_{1k} R_1 \\ \vdots \\ l_{Nk} R_N \end{pmatrix}, \qquad (7)$$

where $\tilde{M}$ has N D-rows, denoted as $\tilde{M}_i$, $i=1, \ldots, N$, where each row is a D×DK matrix. Let $Q_k = g_k g_k^T$, the DK×DK symmetric matrix formed by the product of the ambiguity matrix columns. Then, $$\tilde{M}_i Q_k \tilde{M}_j^T = l_{ik} l_{jk} R_i R_j^T, \ i,j=1, \ldots, N. \qquad (8)$$

To compute $Q_k$, two types of constraints are available: orthonormality of rotation matrices and uniqueness of shape bases.

Orthonormality constraints on rotation matrices can be used to infer 3D structures and motions from 2D images; From the above equation, due to orthonormality of rotations, one obtains:

$$\tilde{M}_i Q_k \tilde{M}_i^T = l_{ik}^2 I_{D \times D}, \; i=1, \ldots, N, \tag{9}$$

where $I_{D \times D}$ is a D×D identity matrix. The D diagonal elements above are equivalent and yield D−1 linear constraints on $Q_k$. The off-diagonal elements are all zeros. Because $Q_k$ is symmetric, there are $(D^2-D)/2$ linear constraints.

According to an embodiment of the invention, one obtains $(N/2)(D^2+D-2)$ linear constraints for N observed shapes. The symmetric matrix $Q_k$ has $(D^2K^2+DK)/2$ distinct elements. When N is large enough so that $$N \geq \frac{D^2 K^2 + DK}{D^2 + D - 2},$$

$Q_k$ would be determined using the linear orthonormality constraints in Eq. (9). However, most of these constraints are dependent on the others and thus redundant. However, it can be shown that the general solution for the orthonormality constraints is $Q_k = G(\Omega + \Lambda)G^T$, where $\Omega$ is an arbitrary block-skew-symmetric matrix and $\Lambda$ is an arbitrary block-scaled-identity matrix. Both $\Lambda$ and $\Omega$ are symmetric. Each D×D block of $\Lambda$ is a scaled identity matrix. All the diagonal D×D blocks of $\Omega$ are zero matrices and the off-diagonal D×D blocks are all skew symmetric matrices.

$\Lambda$ and $\Omega$ respectively contain $(K^2+K)/2$ and $(K^2-K)(D^2-D)/4$ variables. Therefore, no matter how many observations of the deformable shape are measured, enforcing only the orthonormality constraints leads to an ambiguous solution space that has $((K^2-K)(D^2-D)+2(K^2+K))/4$ degrees of freedom. Moreover, this space contains invalid solutions. Specifically, because the desired $Q_k = g_k g_k^T$ is positive semi-definite, the solution $Q_k = G(\Omega + \Lambda)G^T$ is not valid when $(\Omega + \Lambda)$ is not positive semi-definite. Such invalid solutions indeed exist in the space. For example, when $\Lambda = 0$, $(\Omega + \Lambda)$ equals the block-skew-symmetric matrix $\Omega$, which is not positive semi-definite.

The reason the orthonormality constraint is inherently ambiguous is that it cannot determine a unique set of shape bases. Any non-singular linear transformation applied on the bases results in another set of eligible bases. To eliminate the ambiguity, constraints that ensure the uniqueness of shape bases are enforced.

A DK×P sub-matrix of W can be formed from K observed shapes, where K is the basis number previously determined. The condition number of W is a measure of the independence of the underlying deformable shapes. A smaller condition number refers to stronger independence. According to an embodiment of the invention, condition numbers of each possible set of K observed shapes are computed and the set with the smallest condition number is selected. This set contains the most independent K deformable shapes. Since any K independent shapes in the linear deformation space can be regarded as a set of bases, these deformable shapes can be specified as the unique basis set, i.e. the selected observations are respectively scaled and rotated shape bases. Since scaling does not influence the independence of the shapes, the scalars are absorbed into the bases and the selected observations are simply rotated bases.

Denoting the selected observations as the first K measurements, i.e. $W_i = R_i B_i$, $i = 1, \ldots, K$, the corresponding coefficients are thus, $$l_{ii} = 1, \; i=1, \ldots, K$$

$$l_{ij} = 0, \; i, j = 1, \ldots, K, \; i \neq j. \tag{10}$$

According to Eq. (8, 10):

$$\tilde{M}_i Q_k \tilde{M}_j^T = \begin{cases} I_{D \times D}, \; i = j = k \\ 0_{D \times D}, \; (i,j) \in \Phi \end{cases}, \tag{11}$$

where $\Phi$ stands for $\{(i,j) | i=1, \ldots, K; j=1, \ldots, N; i \neq k\}$. These $4N(K-1)$ linear constraints uniquely determine the shape bases.

Solving the linear equations in Eq. (9) and (11) leads to a closed-form solution of $Q_k = g_k g_k^T$, $k=1, \ldots, K$. The $g_k$ can be recovered by decomposing $Q_k$ via SVD. The decomposition of $Q_k$ is up to an arbitrary D×D orthonormal transformation $\Psi$, since $(g_k \Psi)(g_k \Psi)^T$ also equals $Q_k$. This ambiguity arises from the fact that $g_1, \ldots, g_K$ are estimated independently under different coordinate systems. To resolve the ambiguity, $g_1, \ldots, g_K$ need to be transformed to be under a single reference coordinate system.

However, due to Eq. (7), $M_i g_k = l_{ik} R_i$, $i=1, \ldots, N$. Because the rotation matrix $R_i$ is orthonormal, that is, $$|R_i| = 1, \; R_i = \pm \frac{\tilde{M}_i g_k}{|\tilde{M}_i g_k|}.$$

The sign is determined by the orientation of the reference coordinate system. According to an embodiment of the invention, K sets of rotations are computed using $g_1, \ldots, g_K$ respectively. Because of the decomposition ambiguity, there is a D×D orthonormal transformation between each two sets. One of the rotation sets is specified as the reference. The signs of the other rotations are determined such that they are consistent with the corresponding reference rotations. The orthonormal transformations are computed by orthogonal Procrustes Analysis to transform the signed rotation sets to the reference set. These orthonormal transformations also transform $g_1, \ldots, g_K$ to be under a common coordinate system, i.e. the desired ambiguity transformation G is achieved. The coefficients are then computed by Eq. (7), and the shape bases are recovered by Eq. (6). Their combinations reconstruct the deformable shapes.

A flow chart of a direct factorization registration procedure according to an embodiment of the invention is depicted in FIG. 1. Referring now to the figure, the registration begins at step 11 by computing the translation T as the average of the measurements W and then eliminating it by $W = W - T \cdot 1$. Then, at step 12, an SVD is performed to factor $W = MB$, where M is a DN×DK matrix, and B is a DK×P matrix. The rank of W that dominates the energy is then DK. The basis number K is defined as the rank(W)/D, where D is the dimension of the object shape space. At step 13, the K basis observations $W_k$ are selected, W is reordered, and the rank-DK approximation of $W = M \cdot B$ is computed by SVD. At step 14, the matrix $Q_k$, $k=1, \ldots, K$ is computed by solving the linear equations $$M_i Q_k \tilde{M}_i^T = l_{ik}^2 I_{D \times D}, i=1, \ldots, N,$$

or $$\tilde{M}_i Q_k \tilde{M}_j^T = \begin{cases} I_{D \times D}, & i = j = k \\ 0_{D \times D}, & (i,j) \in \Phi \end{cases},$$

from Eqs. (9) and (11) via the least squares algorithm. At step 15, the columns $g_k$, $k=1, \ldots, K$ of $G$ are calculated via SVD, and the rotations are recovered from $$R_i = \pm \frac{\tilde{M}_i g_k}{|\tilde{M}_i g_k|}.$$

The rotations are transformed to a common coordinate system using orthogonal Procrustes Analysis. At step 16, the linear shape model is recovered from $M = \tilde{M} \cdot G$ and $B = G^{-1} \cdot \tilde{B}$, and the coefficients are recovered from $$\tilde{M} g_k = \begin{pmatrix} l_{1k} R_1 \\ \vdots \\ l_{Nk} R_N \end{pmatrix}.$$

Their combinations reconstruct the registered shapes. To save computational cost, one can stop the search for basis observations once a group of K observed shapes with small enough condition number are located, since they specify a set of independent shapes, however, more independent shapes leads to a more reliable registration. When the basis number is determined as 1, the shapes are treated as rigid but noisy data, and a least squares registration similar to that of GPA is achieved.

The performance of the methods according to embodiments of the invention was tested using both simulated and real data, including human faces, myocardium, and dynamic scenes.

The accuracy and robustness of the direct factorization method was quantitatively evaluated with respect to different measurement noise levels and basis numbers. Assuming a Gaussian white noise, the noise strength was represented by the ratio between the Frobenius norms of the noise and the measurements: $|noise|/|W|$. The algorithm was tested under 5 different noise levels, 0%, 5%, 10%, 15%, and 20% respectively. On each level, the rigid settings were examined involving 1 basis and the non-rigid settings involving $2, \ldots,$ and 10 bases respectively in the 2D space. For each of the settings, 100 trials were tested. At each trial, the bases were randomly generated and normalized ($|B_i|=1$). Thus they were generally asymmetric. Sixty-six shapes were constructed as linear combinations of the bases. The combination weights were randomly generated in such a way that the weights for different bases had the same order of magnitude, i.e. none of the bases was dominant. These shapes were then randomly scaled, rotated, translated, and contaminated with noise to generate the observations. Since the bases equally contributed to the shape composition, the bigger the basis number, the more "non-rigid" the shapes and the stronger the noise relative to each individual basis. Thus, in general, the registration is more sensitive to the measurement noise when more bases were involved.

The observed shapes were registered by the proposed method and GPA respectively. Because the space of rotations is a manifold, the errors were measured as the Riemannian distance, $d(R_{est}, R_{truth}) = \arccos(\operatorname{trace}(R_{est} R_{truth}^T)/2)$, in degrees. The shape bases were reconstructed using the aligned shapes that were then projected into the recovered shape space to obtain the desired deformable shapes. The relative reconstruction errors on shapes were computed as $|\text{Reconstruction-Truth}|/|\text{Truth}|$.

When the noise level was 0%, the Direct Factorization method always recovered the exact rigid rotations and deformable shapes with zero errors. When noise was imposed, as expected, the registration was more sensitive to the noise and the errors were greater when the basis number was bigger. Yet the direct factorization method achieved reasonable accuracy, e.g. in the worst case of 10 bases and 20% of the noise level, the average error on shapes was less than 18% and that on rotations was less than 7.5 degrees. In the rigid settings, both methods treated the shapes as rigid but noisy data, and thus performed similarly. However GPA was outperformed in all the non-rigid trials. Even in the noiseless cases, it yielded notable errors, 22% on shapes and 11 degrees on rotations. The errors by GPA were also bigger when the basis number was bigger. But the performance of GPA was little sensitive to noise, because it computes the least squares solution that is insensitive to the Gaussian white noise.

Human faces are highly non-rigid objects. It has been shown in that the 2D images of the face shapes are linear combinations of some basis structures. This linear statistical model is helpful for tasks like face tracking and recognition. One test sequence included 180 images that contained face rotations and facial expressions like blinking and smiling. The 2D face shapes were represented by 68 feature points. Subtracting from the shape measurements the translations, i.e. the average coordinates, the translated shapes were then composed of the deformations and the rotations. The number of bases was estimated as 3 so that 99% of the energy of the translated shapes could remain after the decomposition according to the rank constraint. Then the rigid rotations and the 3-basis linear shape model were reconstructed using the proposed method. The registered shapes were projected into the linear shape space to recover the 3-basis deformable shapes.

Another test example was a face shape sequence, where the deformations were asymmetric and not random: the right eye lid and brow opened up and the left ones closed down simultaneously. These shapes were observed from a fixed view point, without rigid rotations and translations. The observed shapes were thus compositions of two bases. Registration and reconstruction by GPA apparently involved rotations that did not occur in reality, while the Direct Factorization method correctly registered the shapes and reconstructed the deformable model.

Human organs such as heart and brain usually vary their shapes dynamically or across persons. The statistical shape models have been utilized for interpreting the images of these objects in many applications, such as segmenting 2D MRI brain images and tracking the myocardial wall motion in 2D ultrasound images. A method according to an embodiment of the invention was tested on registering the shapes of myocardium in 2D echocardiography images and extracting the linear shape space. The observation data consisted of 120 myocardium images. The method determined the basis number as 3 and recovered the rotations and the 3-basis deformable shapes. The most dominant basis occupied about 90% of the total energy, i.e. the deformations were insignificant like random noise.

3D modeling of dynamic scenes is important for tasks like robot navigation and visual surveillance. When a 3D scene consists of static buildings and vehicles or pedestrians moving along straight lines, the shape is composed of linear bases: the static part and the linear motions. One example sequence contained three toys moving along respective directions simultaneously, two on top of the table and one along the slope. The rest of the scene was static. The scene shape was composed of two bases, one for the static objects and another for the linear motions. Eighteen shapes were observed from different view points. The 2-basis dynamic scene shapes were correctly reconstructed by the Direct Factorization method. Since the linear 3D motions were significant and asymmetric, the corresponding shape deformations should not be treated as Gaussian noise.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 2:
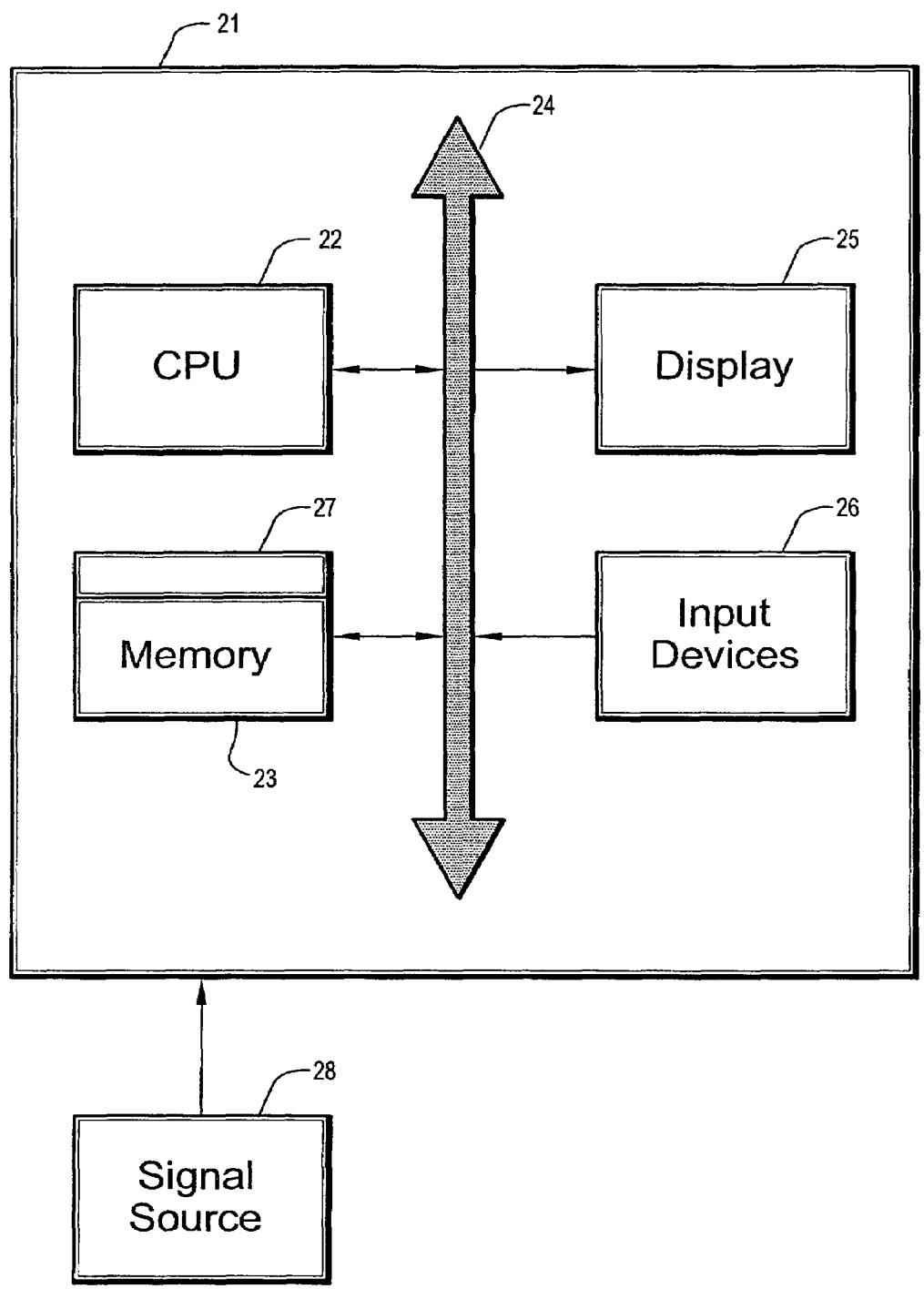
FIG. 2 is a block diagram of an exemplary computer system for implementing a direct factorization registration procedure according to an embodiment of the invention.

FIG. 2 is a block diagram of an exemplary computer system for implementing a direct factorization registration method according to an embodiment of the invention. Referring now to FIG. 2, a computer system 21 for implementing the present invention can comprise, inter alia, a central processing unit (CPU) 22, a memory 23 and an input/output (I/O) interface 24. The computer system 21 is generally coupled through the I/O interface 24 to a display 25 and various input devices 26 such as a mouse and a keyboard. The support circuits can include circuits such as cache, power supplies, clock circuits, and a communication bus. The memory 23 can include random access memory (RAM), read only memory (ROM), disk drive, tape drive, etc., or a combinations thereof The present invention can be implemented as a routine 27 that is stored in memory 23 and executed by the CPU 22 to process the signal from the signal source 28. As such, the computer system 21 is a general purpose computer system that becomes a specific purpose computer system when executing the routine 27 of the present invention.

The computer system 21 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of registering and modeling a deformable shape in a digitized image comprising the steps of:
providing a set of measurements of a deformable shape, wherein said set of measurements forms a measurement matrix; and
simultaneously solving for a rigid registering transformation and a linear shape model, by forming an average of said set of measurements and subtracting said average from said set of measurements;
decomposing said measurement matrix into a product of a proposed scaled rotation matrix and a proposed basis matrix;
calculating a product matrix of an ambiguity transformation from said proposed scaled rotation matrix and said proposed basis matrix;
constraining and decomposing said product matrix to determine an ambiguity transformation matrix;
using said ambiguity transformation matrix to determine a true scaled rotation matrix and a true basis matrix; and
constructing a registered shape from said true scaled rotation matrix and said true basis matrix.

2. The method of claim 1, further comprising determining a rank of said measurement matrix and a basis number K from said rank.

3. The method of claim 2, wherein the set of measurements is a subset of K measurements selected from a set of N measurements, wherein K<N, and wherein said selected subset has a smallest condition number of all possible subsets of K measurements.

4. The method of claim 3, wherein said ambiguity transformation matrix is calculated by imposing orthonormality constraints on the proposed scaled rotation matrix, and by imposing uniqueness constraints on the proposed basis matrix.

5. The method of claim 4, wherein imposing uniqueness constraints on the proposed basis matrix further comprises selecting the K measurements with the smallest condition number as a rotated basis set, and calculating scaling coefficients for the proposed scaled rotation matrix.

6. The method of claim 1, wherein said measurement matrix is decomposed using a singular value decomposition.

7. The method of claim 1, wherein said ambiguity transformation matrix is decomposed using a singular value decomposition.

8. The method of claim 7, further comprising the step of transforming the ambiguity transformation matrix into a common coordinate system using orthogonal Procrustes analysis.

9. A method of registering and modeling a deformable shape in a digitized image, comprising the steps of:
providing a measurement matrix W of N measurements of P points of a D-dimensional deformable shape;
determining a basis number K for the N measurements, wherein K<N, and selecting K measurements of said measurement matrix W as a basis set;

decomposing said measurement matrix W into a matrix product M×B, wherein M is a proposed scaled rotation matrix and B is a proposed basis matrix computing a matrix $Q_k$ defined by $$M_i Q_k M_j^T = \begin{cases} I_{D \times D}, & i = j = k \\ 0_{D \times D}, & (i, j) \in \Phi \end{cases},$$

where $\Phi$ stands for $\{(i,j)|i=1,\ldots,K; j=1,\ldots,N; i \neq k\}$, which represents an ambiguity matrix transforming the proposed scaled rotation matrix and the proposed basis matrix into a true scaled rotation matrix and a true basis matrix;

decomposing the matrix $Q_k$ into $g_k g_k^T$, for k=1, ..., K, wherein $g_k$ is a column of a DK×DK matrix G; and recovering the true scaled rotation matrix from M×G and the true basis matrix from $G^{-1} \times B$; and constructing a registered shape from said true scaled rotation matrix and said true basis matrix.

10. The method of claim 9, wherein the measurement matrix W is of size DN×P, and further comprising decomposing the measurement matrix W to determine a rank DK of the measurement matrix W, and wherein said basis number K is defined by rank(W)/D.

11. The method of claim 10, wherein the proposed scaled rotation matrix M is of size DN×DK, and the proposed basis matrix B is of size DK×P.

12. The method of claim 9, wherein the matrix $Q_k$ is computed by a least squares algorithm.

13. The method of claim 9, wherein an unsealed rotation $R_i$ is determined from $g_k$ by $$R_i = \pm \frac{M_i g_k}{|M_i g_k|}$$

for a size D×N row $M_i$ of scaled rotation matrix M.

14. A program storage device readable by a computer, tangibly embodying a program of instructions executable by the computer to perform the method steps for registering and modeling a deformable shape in a digitized image comprising the steps of:

providing a set of measurements of a deformable shape, wherein said set of measurements forms a measurement matrix; and simultaneously solving for a rigid registering transformation and a linear shape model, by forming an average of said set of measurements and subtracting said average from said set of measurements;

decomposing said measurement matrix into a product of a proposed scaled rotation matrix and a proposed basis matrix;

calculating a product matrix of an ambiguity transformation from said proposed scaled rotation matrix and said proposed basis matrix;

constraining and decomposing said product matrix to determine an ambiguity transformation matrix;

using said ambiguity transformation matrix to determine a true scaled rotation matrix and a true basis matrix; and constructing a registered shape from said true scaled rotation matrix and said true basis matrix.

15. The computer readable program storage device of claim 14, further comprising determining a rank of said measurement matrix and a basis number K from said rank.

16. The computer readable program storage device of claim 15, wherein the set of measurements is a subset of K measurements selected from a set of N measurements, wherein K<N, and wherein said selected subset has a smallest condition number of all possible subsets of K measurements.

17. The computer readable program storage device of claim 16, wherein said ambiguity transformation matrix is calculated by imposing orthonormality constraints on the proposed scaled rotation matrix, and by imposing uniqueness constraints on the proposed basis matrix.

18. The computer readable program storage device of claim 17, wherein imposing uniqueness constraints on the proposed basis matrix further comprises selecting the K measurements with the smallest condition number as a rotated basis set, and calculating scaling coefficients for the proposed scaled rotation matrix.

19. The computer readable program storage device of claim 14, wherein said measurement matrix is decomposed using a singular value decomposition.

20. The computer readable program storage device of claim 14, wherein said ambiguity transformation matrix is decomposed using a singular value decomposition.

21. The computer readable program storage device of claim 20, further comprising the step of transforming the ambiguity transformation matrix into a common coordinate system using orthogonal Procrustes analysis.

* * * * *